United States Patent
Pronovost et al.

(10) Patent No.: US 7,830,387 B2
(45) Date of Patent: Nov. 9, 2010

(54) PARALLEL ENGINE SUPPORT IN DISPLAY DRIVER MODEL

(75) Inventors: Steve Pronovost, Kenmore, WA (US); Anuj B. Gosalia, Redmond, WA (US); Ameet Arun Chitre, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 800 days.

(21) Appl. No.: 11/557,301

(22) Filed: Nov. 7, 2006

(65) Prior Publication Data

US 2008/0109810 A1 May 8, 2008

(51) Int. Cl.
*G06F 15/00* (2006.01)
*G06F 15/16* (2006.01)
*G06T 1/00* (2006.01)

(52) U.S. Cl. ..................... 345/501; 345/502

(58) Field of Classification Search ................. 345/501, 345/502, 503, 505, 506, 519; 718/102, 103
See application file for complete search history.

(56) References Cited

U.S. PATENT DOCUMENTS

| | | | |
|---|---|---|---|
| 5,745,762 A | 4/1998 | Celi, Jr. et al. | |
| 7,015,913 B1 * | 3/2006 | Lindholm et al. | 345/501 |
| 2002/0015055 A1 | 2/2002 | Foran | |
| 2003/0140179 A1 * | 7/2003 | Wilt et al. | 709/321 |
| 2004/0160446 A1 | 8/2004 | Gosalia et al. | |
| 2005/0138328 A1 | 6/2005 | Moy et al. | |
| 2005/0197977 A1 | 9/2005 | Buck et al. | |
| 2005/0285866 A1 | 12/2005 | Brunner et al. | |
| 2006/0114254 A1 | 6/2006 | Day et al. | |

FOREIGN PATENT DOCUMENTS

WO  WO2005050557  11/2006

OTHER PUBLICATIONS

Dale, K., et al.; Applications of Small-Scale Reconfigurability to Graphics Processors; 2006; 10 pages.
Robison, A., et al.; An Overview of Graphics Processing Hardware; Mar. 14, 2006; 21 pages.
Colantoni, P., et al.; Fast and Accurate Color Image Processing Using 3D Graphics Cards; Nov. 2003; 9 pages.
Vanburen, B.; Graphical Processing Units; Nov. 10, 2004; 12 pages.

* cited by examiner

*Primary Examiner*—Kee M Tung
*Assistant Examiner*—Jacinta Crawford
(74) *Attorney, Agent, or Firm*—Shook, Hardy & Bacon L.L.P.

(57) ABSTRACT

Systems and methods that independently control divided and/or isolated processing resources of a Graphical Processing Unit (GPU). Synchronization primitives for processing are shared among such resources to process interaction with the engines and their associated different requirements (e.g. different language). Accordingly, independent threads can be created against particular nodes (e.g., a video engine node, 3D engine node), wherein multiple engines can exist under a single node, and independent control can subsequently be exerted upon the plurality of engines associated with the GPU.

19 Claims, 9 Drawing Sheets

PARALLEL ENGINE SUPPORT IN DISPLAY DRIVER MODEL

BACKGROUND

Modern operating systems drive many of today's technology-based innovations by offering a platform for both hardware and software development while serving many diverse needs. These systems have evolved from simplistic file management systems to more complex workstations that provide high-end performance at reasonable cost. Moreover, such systems often include multi-processing architectures, high-speed memory, advanced peripheral devices, a variety of system libraries/components to aid software development, and intricate/interleaved bus architectures, for example. At the heart of these systems exists sophisticated operating systems that manage not only computer-related hardware but, a vast array of software components having various relationships. Such components are commonly described in terms of objects or classes that have multi-tiered relationships (e.g., a hierarchical arrangement) for files and directories that are found in many data management systems.

Furthermore, transaction processing systems have paved the way for many ideas in distributed computing and fault-tolerant computing. Accordingly, transaction processing systems have introduced distributed data for reliability, availability, performance, fault tolerant storage and processes—in addition to—contributing to a client-server model and remote procedure call for distributed computation. Due to the nature of operating system industry, a large number of device drivers are typically written by third parties (who are typically hardware owners), rather than being written by the operating system manufacturer. Outside third parties typically do not have access to base team development resources available within the manufacturer, and such restrictions adversely affect rapid delivery of device drivers to markets. Problems can further exacerbated because many of such drivers operate in an unprotected kernel mode of the operating system (e.g., ring 0), which often implies that the slightest coding error may cause a system crash, or a corruption to files and/or data.

In addition, many large software systems operate in a highly threaded model, to support "plug in" software models and extend the function of the system. In general, since operating systems are highly threaded, plug in device drivers associated therewith are also highly threaded, hence adding to complexities involved. At the same time, graphics adapters that are associated with these systems continue to handle an increased number of tasks. Today, parallel engines exposed by such Graphics Processing Units (GPUs) are expected to fully and effectively manage efficient playback of video as well as managing multiple adapters. Accordingly, a graphical user interface (GUI) commonly is associated with a process (or an engine) that executes computer-executable instructions in response to requests and/or information provided by the GUI. Nonetheless, in various types of applications, resources for the GPUs are not efficiently employed.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation provides for systems and methods that divide and/or isolate resources of a Graphical Processing Unit (GPU) into a plurality of engines, wherein independent control can subsequently be exerted upon the plurality of the engines. Such engines further share synchronization primitives to enable processing interaction therebetween, and hence satisfy associated different requirements (e.g. different language). Independent communication channels between user mode driver and a predetermined engine (e.g., engine for a particular task such as 3D rendering) can be provided, wherein synchronization primitives enable different threads to synchronize each other—even though such threads have different characteristics, for example. Accordingly, independent threads can be created against particular nodes (e.g., a video engine node, 3D engine node), wherein multiple engines can exist under a single node, and independent control can subsequently be exerted upon the plurality of engines that can form resources of the GPU.

In a related aspect, synchronization primitive(s) of the subject innovation enable a programmer to employ multiple threads to instruct a scheduler of ordering operation. Each node of computing can interact with multiple engines to distribute the work across both physical adapters, to provide work in combination. Hence, such scheduler can be extended, to manage more than one hardware queue per GPU. An associated driver can expose engine topology to the scheduler, followed by instantiation of a hardware queue per engine. Accordingly, GPU threads of execution (e.g., GPU Context) can be created against specific node(s), and are typically scheduled on engines defined within that node only. Such an arrangement enables, a GPU device to be considered a "Process" (or address space—and can contain multiple contexts or threads of execution) to support new context creation/destruction Display Driver Interface (DDI) in kernel mode. Hence, a driver that is context aware can create contexts against a specific node by employing a new user-mode DDI. Additionally, multiple independent physical adapters can be merged into a single logical adapter, wherein each node of computing has multiple engines to distribute the work across both physical adapters, and provide work in combination.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
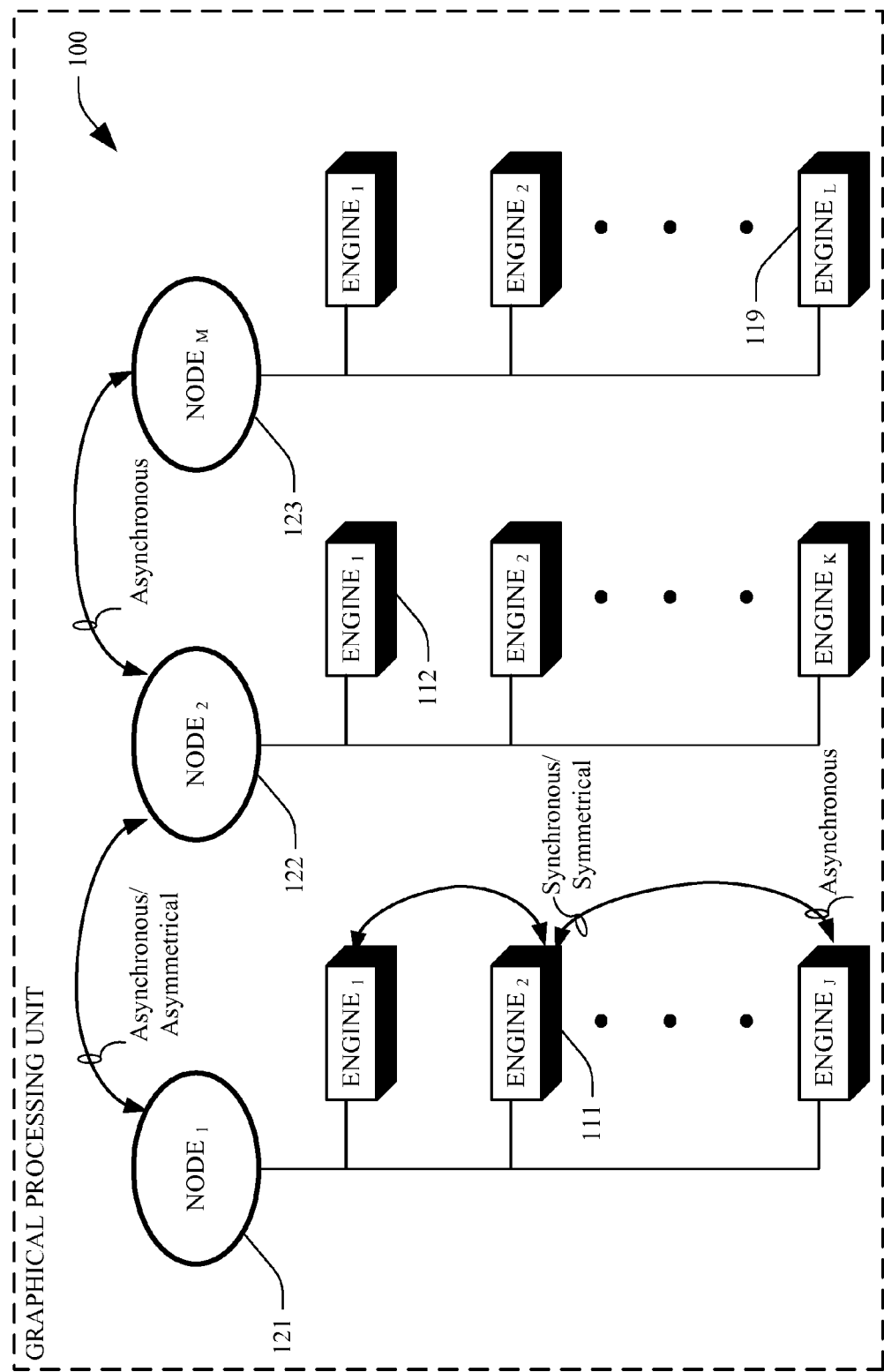
FIG. 1 illustrates a block diagram of a Graphical Processing Unit (GPU) that is divisible into a plurality of isolated and independently controlled resources.

FIG. 1 illustrates an arrangement associated with a Graphical Processing Unit (GPU) 100 that divides and/or isolate its resources into a plurality of engines 111, 112, 119 (e.g., where L, J, K are integers). A new object (e.g. a GPU context) can be introduced in the basic scheduling model to represent a thread of execution on a particular node 121, 122, 123 (1 thru M, M being an integer). Such new object can be referred as to a "GPU Context", which for example is a thread of execution on a particular node represented by such context. The GPU context can resemble a "thread"—in Central Processing Unit vernacular—whereas a "GPU device" resembles a "process". Each GPU context can be assigned a respective command buffer, allocation list, patch location list, pool of Dynamic Memory Access (DMA), and the like.

Accordingly, GPU threads of execution (e.g. GPU Context) can be created against a specific node, and typically are only scheduled on engines defined within that node. Such an arrangement enables, a GPU device to be considered a "Process" (or address space) and can contain multiple contexts (threads of execution) to support new context creation/destruction Display Driver Interface (DDI) in kernel mode. A driver that is context aware can create contexts against a specific node by employing a new user-mode DDI.

If one analogizes concepts of the subject innovation with the CPU vernacular, the disclosed GPU devices can be viewed/resembled as processes (or address spaces) and their associated GPU context can be viewed/resembled as threads, when compared to such CPU terminology. In particular, a GPU context is created against a specific node 121, 122, 123, and is in general only scheduled within such node 121, 122, 123 for a respective lifetime. For example, each GPU context can be assigned its own command buffer, allocation list, patch location list and pool of associated buffers (e.g., Dynamic Memory Access—DMA buffers), wherein such buffers can typically only be submitted against the engine (111, 112, 119) within the specified node (121, 122, 123). Likewise, when the runtime creates an Application Program Interface (API) device, in general only an address space can be created. The user mode driver can explicitly create thread of execution within that address space by creating context, wherein the user-mode driver can specify the node (121, 122, 123) on which such context will be executing thereupon. Synchronization primitives can be provided to enable a programmer to employ multiple threads to instruct a scheduler of ordering operation. Each node (121, 122, 123) of computing can interact with multiple engines to distribute the work across both physical adapters, to provide work in combination. Hence, such scheduler can be extended, to manage more than one hardware queue per GPU. An associated driver can expose engine topology to the scheduler, followed by instantiation of a hardware queue per engine. Hence, divisions and/or isolation of resources for a Graphical Processing Unit (GPU) into a plurality of engines is provided, wherein independent control can subsequently be exerted upon the plurality of the engines. Such engines further share synchronization primitives, as described in detail infra, to enable processing interaction therebetween, and hence satisfy associated different requirements (e.g., different language).

Figure 2:
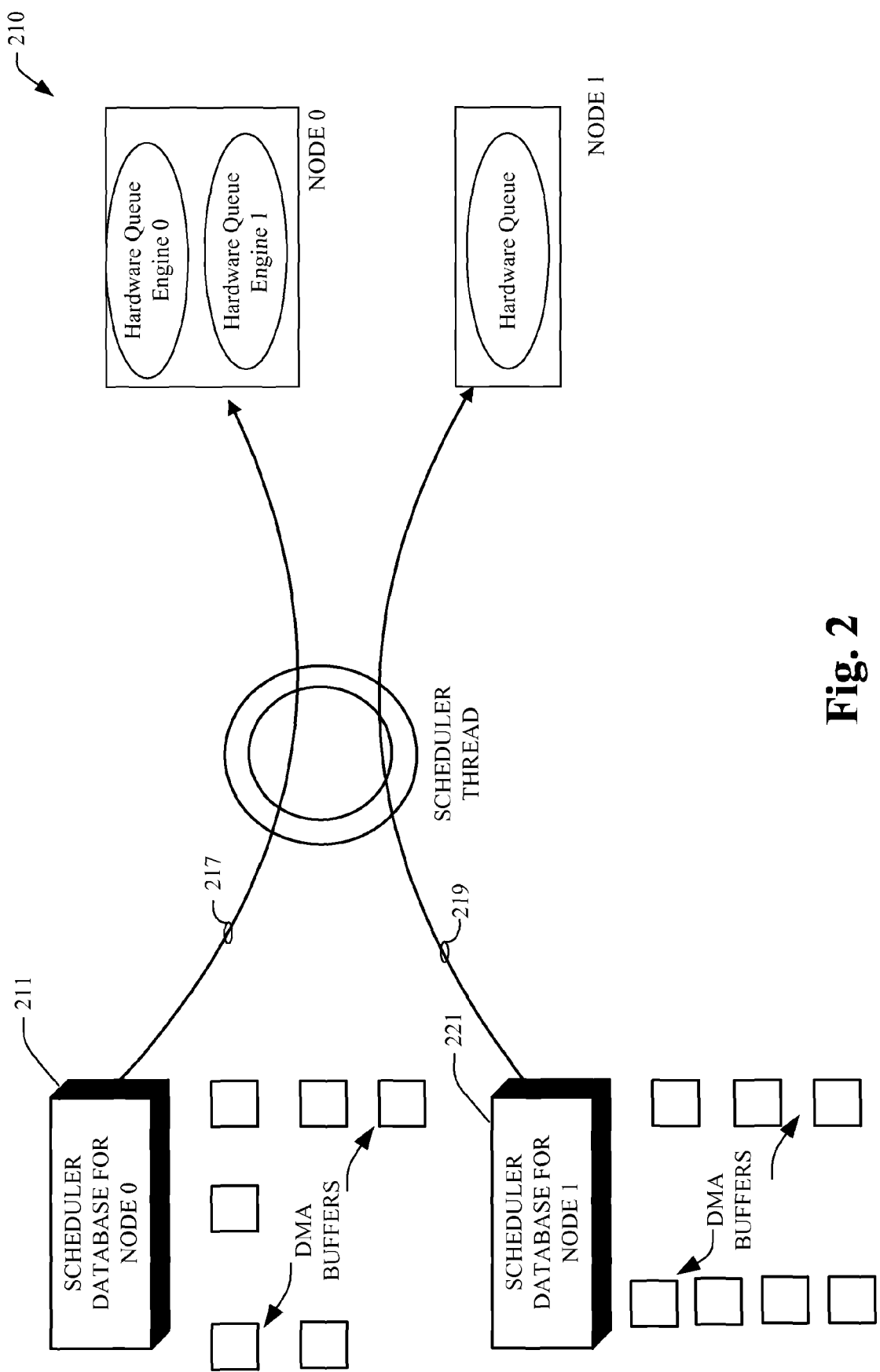
FIG. 2 illustrates a further block diagram of nodes with respective schedulers that can be scheduled independently in accordance with an aspect of the subject innovation.

FIG. 2 illustrates a further block diagram that illustrates nodes with respective schedulers that can be scheduled independently in accordance with an aspect of the subject innovation. Scheduler data bases 211, 221 are provided for node "0" and node "1" respectively, wherein threads 217 and 219 associate therewith. Accordingly, multiple isolated engines can form resources for the Graphical Processing Unit, wherein independent communication channels between user mode driver and a particular engine can be provided, wherein synchronization primitives (e.g., based on mutex queuing) enable different threads to synchronize each other—even though such threads have different characteristics, for example. Hence, independent threads can be created against particular nodes (e.g. a video engine node, 3D engine node), wherein multiple engines can exist under a single node, and independent control can subsequently be exerted upon the plurality of engines associated with the GPU.

For example, the schedulers associated with nodes "0" and node "1" can maintain a hardware queue for every parallel engine defined by the display driver, in addition to maintaining corresponding fence and interrupt information. It is to be appreciated that such driver typically needs to specify the node information for every fence reported. Synchronization primitives of the subject innovation enable a programmer to employ multiple threads to instruct a scheduler of ordering operation. Each node (e.g., node "0" and node "1") of computing can interact with multiple engines to distribute the work across both physical adapters, to provide work in combination. Hence, such scheduler can be extended, to manage more than one hardware queue per GPU. An associated driver can expose engine topology to the scheduler, followed by instantiation of a hardware queue per engine. It is to be appreciated that synchronization instances that require occurrence at very high rates (e.g., wherein software synchronization primitives are typically not practical.) Hence, the display driver can employ hardware synchronization primitives that are protected in turn by software synchronization primitives.

The scheduler can maintain a hardware queue and fence information (not shown) for every parallel engine defined by the driver. The kernel mode driver can maintain a ring buffer per engine where DMA buffer submissions from the scheduler for that engine are accumulated. Each parallel engine can also have its own fence location and interrupt notification. Moreover, the scheduler can maintain hardware queue and/or fence information for every parallel engine defined by the driver. The kernel mode driver can further maintain a ring buffer per engine where DMA buffer submissions from the scheduler for that engine are accumulated. Each parallel engine typically has its own fence location and interrupt notification.

Figure 3:
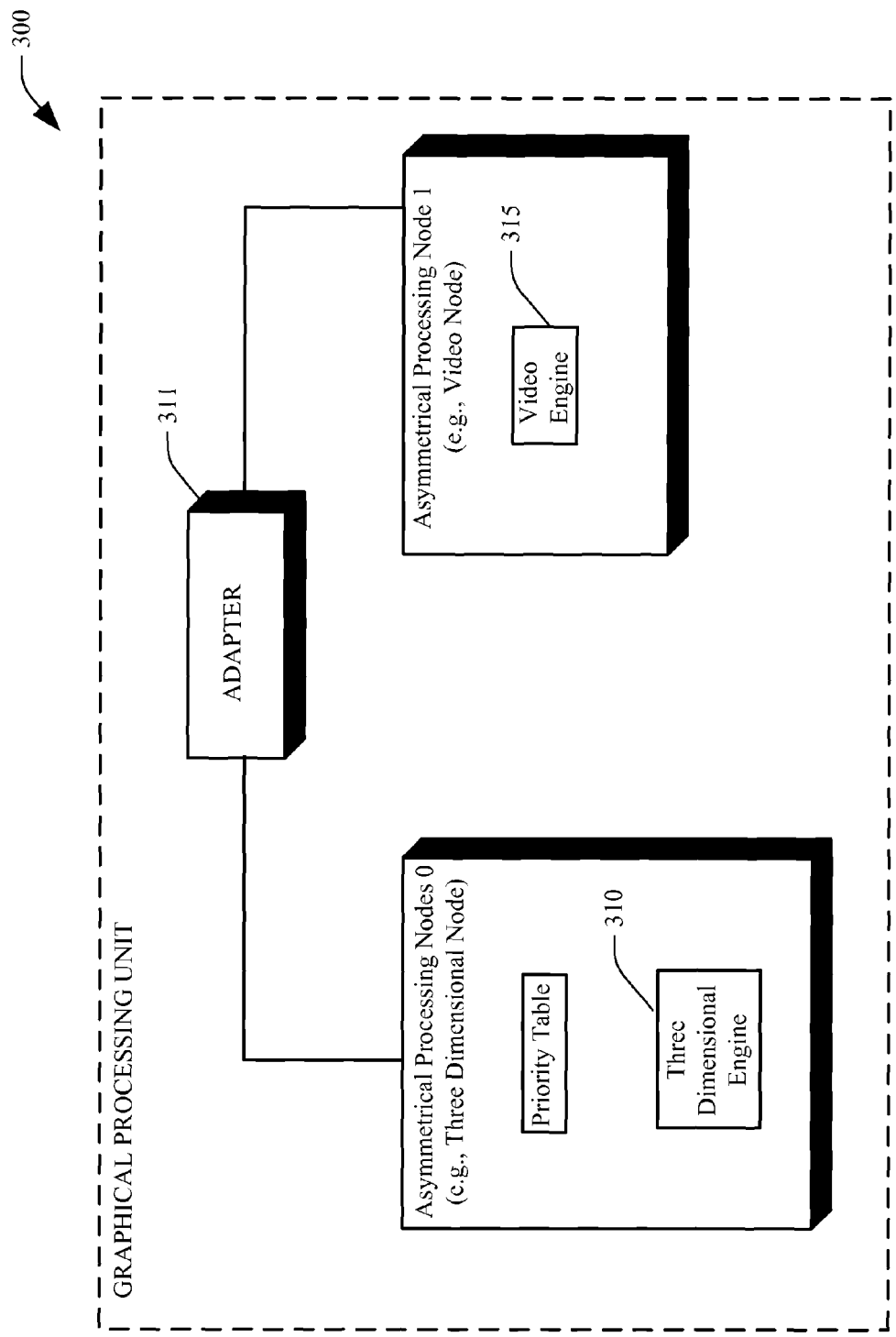
FIG. 3 illustrates a further block diagram that represents a model of parallelism for multiple engines as part of GPU resources in accordance with an aspect of the subject innovation.

FIG. 3 illustrates a further block diagram that represents a model of parallelism for multiple engines as part of GPU resources in accordance with an aspect of the subject innovation. The system 300 divides and/or isolates resources of a Graphical Processing Unit (GPU) into a plurality of engines 310 (e.g., a three dimensional engine, a video engine associated with the GPU) wherein such engines share synchronization primitives for processing. The system 300 enables independent control to be exerted upon the three dimensional engine 310 and video engine 315. Each node of computing can interact with multiple engines to distribute the work across both physical adapter(s) 311, to provide work in combination. Hence, a scheduler can be extended, to manage more than one hardware queue per GPU. An associated driver can expose engine topology to the scheduler, followed by instantiation of a hardware queue per engine.

Figure 4:
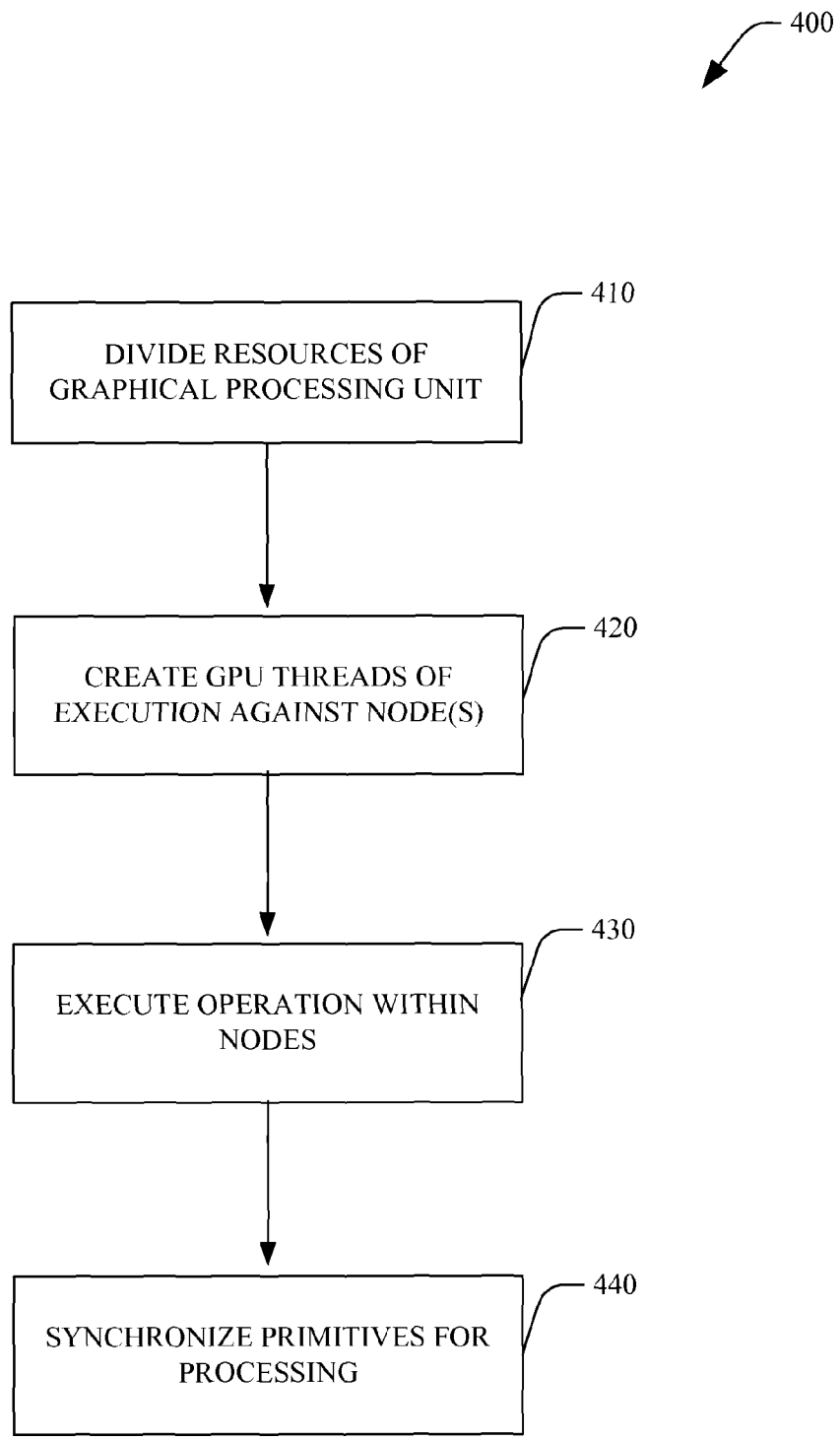
FIG. 4 illustrates a related methodology of exerting independent control on a plurality of isolated engines in a GPU, to provide work in combination.

FIG. 4 illustrates a related methodology of exerting independent control on a plurality of isolated engines in a GPU, to provide work in combination. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 410, resources of a graphical processing unit can be divided into a plurality of resources, such as for example a plurality of engines for executing processes. Next, and at 420 GPU threads of execution (e.g. GPU Context) can be created against a specific node, and typically are only scheduled on engines defined within that node. Subsequently, and when a GPU context is created against a specific node at 430—such creation is in general only scheduled within such node for a respective lifetime. For example, each GPU context can be assigned its own command buffer, allocation list, patch location list and pool of associated buffers (e.g. Dynamic Memory Access—DMA buffers) wherein such buffers can typically only be submitted against engines within the specified node. At 440 synchronization primitives can be provided to enable a programmer to employ multiple threads to instruct a scheduler of ordering operation. Such synchronization primitives enable processing interaction with the engines and their associated different requirements (e.g., different language).

Figure 5:
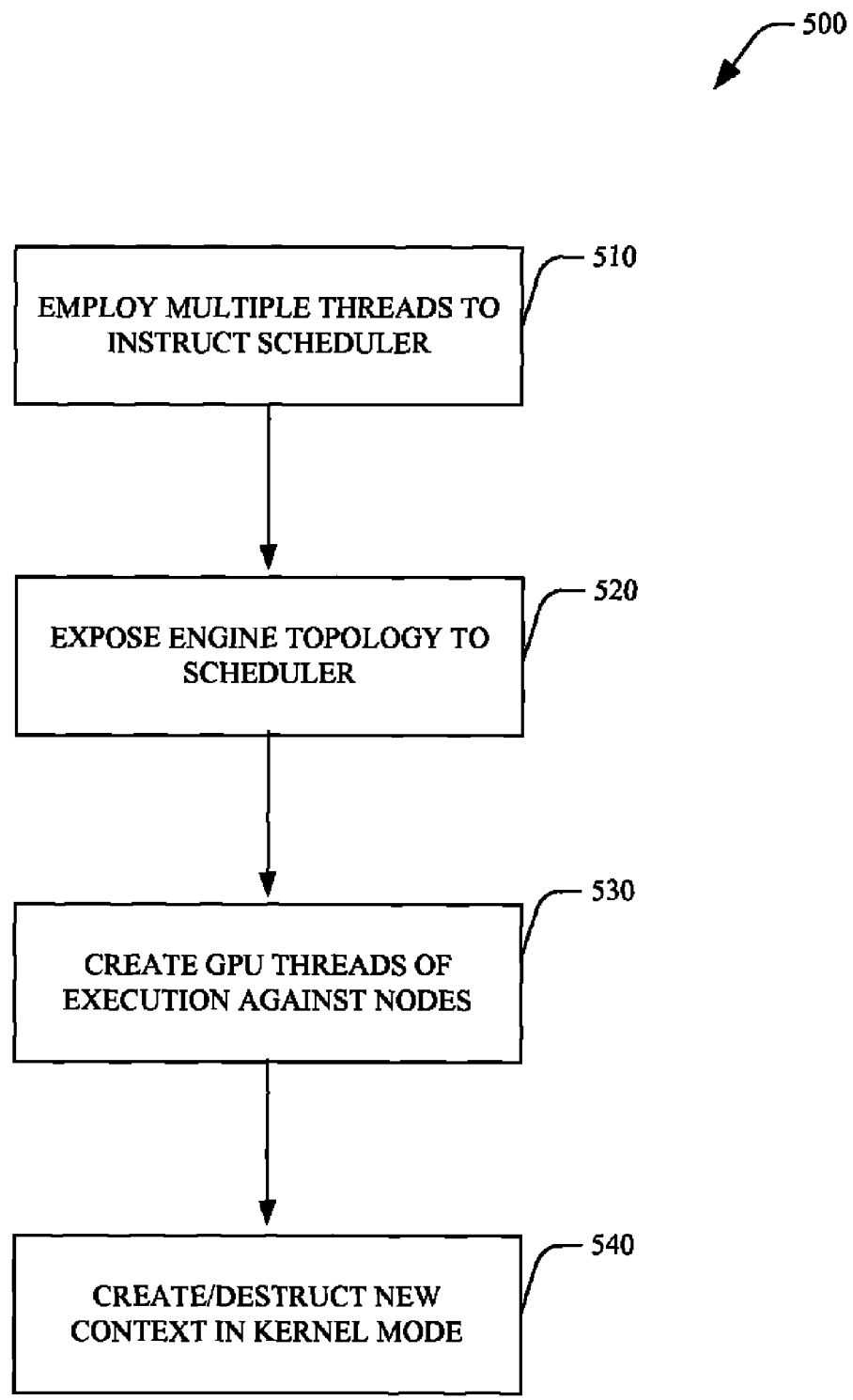
FIG. 5 illustrates a related methodology of independently scheduling resources that are associated with a GPU in accordance with an aspect of the subject innovation.

FIG. 5 illustrates a related methodology 500 of independently scheduling resources associated with a GPU in accordance with an aspect of the subject innovation. Initially and at 510, synchronization primitives of the subject innovation enable a programmer to employ multiple threads to instruct a scheduler of ordering operation. Each node of computing can interact with multiple engines to distribute the work across both physical adapters, to provide work in combination. Hence, such scheduler can be extended, to manage more than one hardware queue per GPU. At 520, an associated driver can expose engine topology to the scheduler, followed by instantiation of a hardware queue per engine. Accordingly, GPU threads of execution (e.g., GPU Context) can be created at 530 against a specific node, and typically these threads of execution are only scheduled on engines defined within that node. Such an arrangement enables, a GPU device to be considered a "Process" (or address space) and can contain multiple contexts (threads of execution) to support new context creation/destruction DDI in kernel mode at 540. A driver that is context aware can create contexts against a specific node by using a new user-mode Display Driver Interface (DDI).

Figure 6:
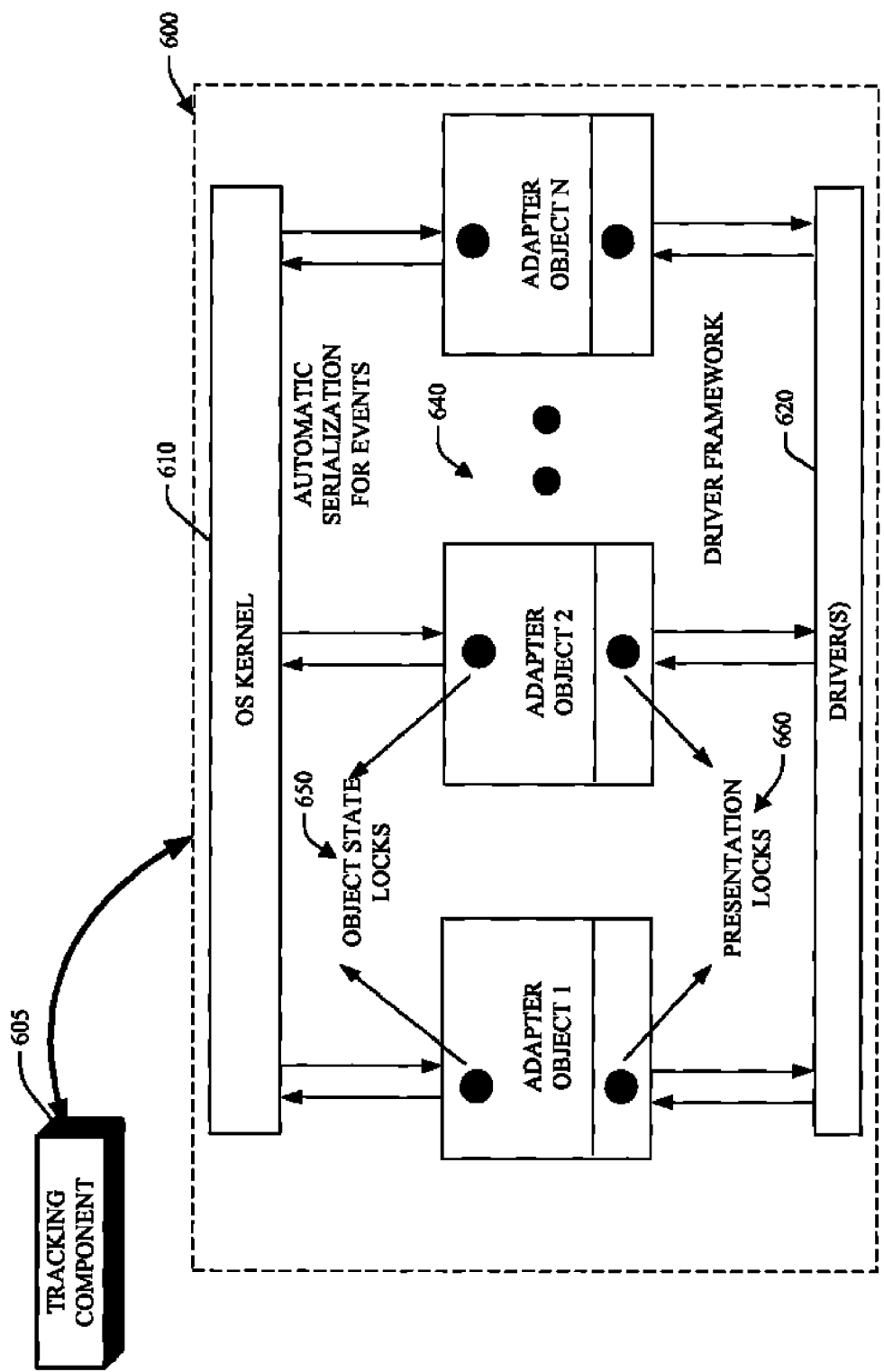
FIG. 6 illustrates a driver management system and model for managing a plurality of hardware queue per GPU, in accordance with an aspect of the subject innovation.

FIG. 6 illustrates a driver management system and model 600 for managing more than one hardware queue per GPU, in accordance with an aspect of the subject innovation. The system 600 includes an operating system of kernel 610 that generally operates or performs in a multi or highly-threaded software environment (e.g., tens, hundreds or thousands of threads). The kernel 610 can interact with a lesser or lower-threaded module (e.g., less than 10 threads) such as one or more drivers 620.

In general, the objects 640 can act as an adapter between the highly threaded environment of the software system 610, and the potentially less threaded model of a software plug-in such as the drivers 620. The adapter object 640 generally can include internal state data, and one or more sets of locks for managing interactions between system and modules. For example, such locks can include an internal object state lock 650 that provides synchronization for modifications to internal object state data. Such locks can be acquired and released for short time intervals in response to an event from the system 610 that modifies the object, or an API call from the software module or driver 620. Alternatively, this type lock can be held as long as is required to perform a state update in a consistent manner, wherein respective routines exposed to the highly threaded internal software environment 610 follow applicable operating rules associated therewith.

Moreover, and in regards to referencing allocation, every context created by a user mode driver can access any of the allocations created (e.g., against the owning device.) For example, to reference an allocation from a Dynamic Memory Access (DMA) buffer of a particular context, the driver creates an allocation list and a patch location list which can be submitted to the scheduler along with the DMA buffer.

Since allocations can be referenced by various engines, the order in which allocations are referenced will generally differ from the order in which operations referencing such allocations are completed. A tracking component 605 can track the busy status of an allocation by tracking which engine employs an allocation, to ensure proper synchronization operation for locking, destroying and paging. Accordingly, for lock and destroy purposes, the tracking component 605 can consider an allocation busy when there exist queued DMA buffers that reference such allocation (which has not been completed by the GPU.) Such DMA buffers may already have been submitted to the hardware queue, and expected to be completed momentarily; and/or alternatively await scheduling in the scheduler database.

Likewise, for locks, the user mode driver can specify if it requires the tracking component 605 to synchronize access to the allocation being locked. If synchronization is not required, the tracking component can grant access—(even though one or more engine can currently be operating on such allocation.) Moreover, if synchronization is required, the tracking component 605 can await until all engines have performed associated allocations. Similarly, for allocation destruction, the tracking component can await operation for all engines to be completed with an allocation before destroying it. It is to be appreciated that the destroy callback can return to the user mode driver before such allocation is actually destroyed. Moreover, the tracking component 605 typically does not enforce synchronization for access to an allocation by various contexts. Moreover, multiple contexts can be accessing an allocation for either read or write operation at any given time.

With regard to paging, since paging operations are executed on a particular engine, the tracking should typically enforce proper synchronization between such operations and other access to the same allocation on different engines. In addition, for the tracking component to synchronize paging operation the node paging operation that are to be executed are identified.

The tracking component 605 can further track which allocations are employed at any given time. For example, whenever a DMA buffer is about to be submitted for execution on a different engine than the paging engine, the tracking component can verify if any of the allocation referenced by the DMA buffer are currently the target of a paging operation that has not been completed. Also, if none of the allocations are currently the target of paging operation, the DMA buffer can be submitted to the targeted engine (e.g., submitted immediately.) For each allocation that is currently the target of a paging operation, the tracking component can block the preparation thread until the paging operation on the allocation completes.

Similarly, prior to submitting a paging operation, the tracking component 605 can check if the allocation being the target of the operation is currently being employed by an engine other than the engine that the paging operation will be executed thereon. If the allocation is not currently being employed, the paging operation is built and submitted normally. Also, if the allocation is currently employed by another engine, the paging operation can block the preparation thread until all engines are performed with the allocation—followed by submitting the paging operation to the driver. For parallel paging engines, the tracking component 605 can employ a dedicated operation for paging of driver that is so chosen, wherein to employ a dedicated engine for paging, the driver should typically specify a paging node that is not otherwise employed. In addition, another type of lock can include a presentation lock 660 that is acquired when events are presented through callbacks into the less threaded software module 620. When an event handler callback (or other routine) returns, such lock 660 can be automatically released.

Figure 7:
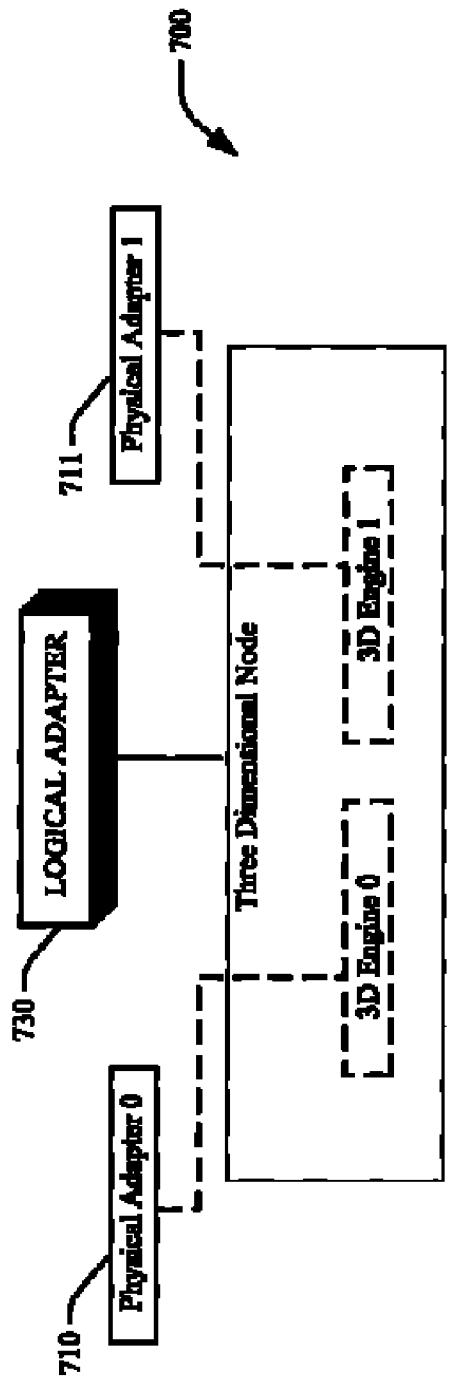
FIG. 7 illustrates a particular system for linkage of dual engines in accordance with an aspect of the subject innovation.
Figure 8:
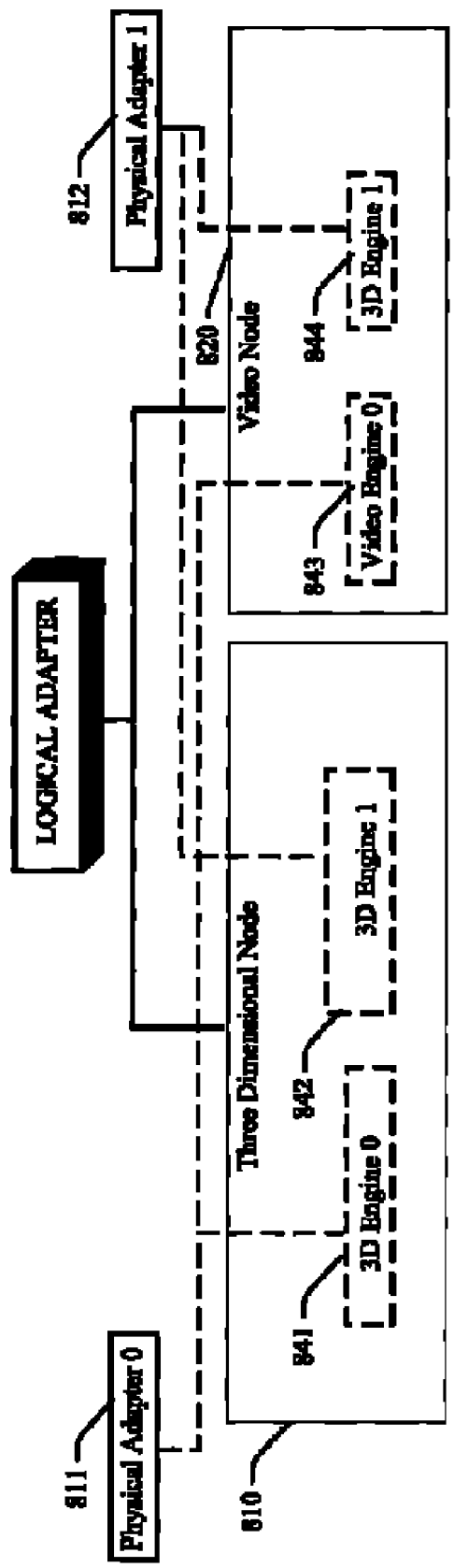
FIG. 8 illustrates a further example for linkage of nodes in accordance with an aspect of the subject innovation.

FIGS. 7 & 8 illustrate particular systems 700, 800 that exemplify GPUs that are linked together. FIG. 7 illustrates GPUs wherein each contains a single three dimensional node on a respective local node "0". Typically a linked adapter can refer to a mode of operation where multiple physical adapters (e.g., adapter visible on the bus) are merged together into a single logical adapter 730. Accordingly, and from applications points of view, in general only the logical adapter 730 is visible. Likewise, and transparent to operation (e.g., behind the scene) the user mode driver and kernel mode driver can employ typically all physical adapters within the link to boost the performance of the logical adapter 730. The logical adapter 730 can offer substantially higher performance than any of the physical adapters independently.

The driver can typically link physical adapters that have identical capability and identical memory configuration. Moreover, the physical adapter comprising a logical adapter can be visible on the PCIE bus as an independent device. The model can assume that all nodes within a given physical adapter have uniform access to that physical adapter's memory. For a linked adapter, the kernel mode driver can expose the capability of a head link only. The overall topology can be constructed by merging the capabilities (which is assumed to be identical) of all physical adapters in the link.

The arrangement 700 includes adapters in the link within their corresponding node. For example, if the two physical adapters 710, 711 in the link have one node each, the resulting logical adapter 730 can have one node with two engines. Because each physical adapter can typically expose exactly one engine per node, the engine index within a node is thus the same as the physical adapter index. Likewise, FIG. 8 illustrates a three dimensional node 810 and a video node 820 for linkage together. The display driver for such linked adapters can typically create one context per adapter in the link, followed by submitting commands to each adapter 811, 812 according to a current mode of operation. Accordingly, if the same GPU commands are required to be sent to more than one engine 841, 842, 843, 843, the display can copy such commands within each of the command buffers corresponding to the target.

As used in herein, the terms "component," "system" and the like are intended to refer to a computer-related entity, either hardware, a combination of hardware and software, software or software in execution. For example, a component may be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation may be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
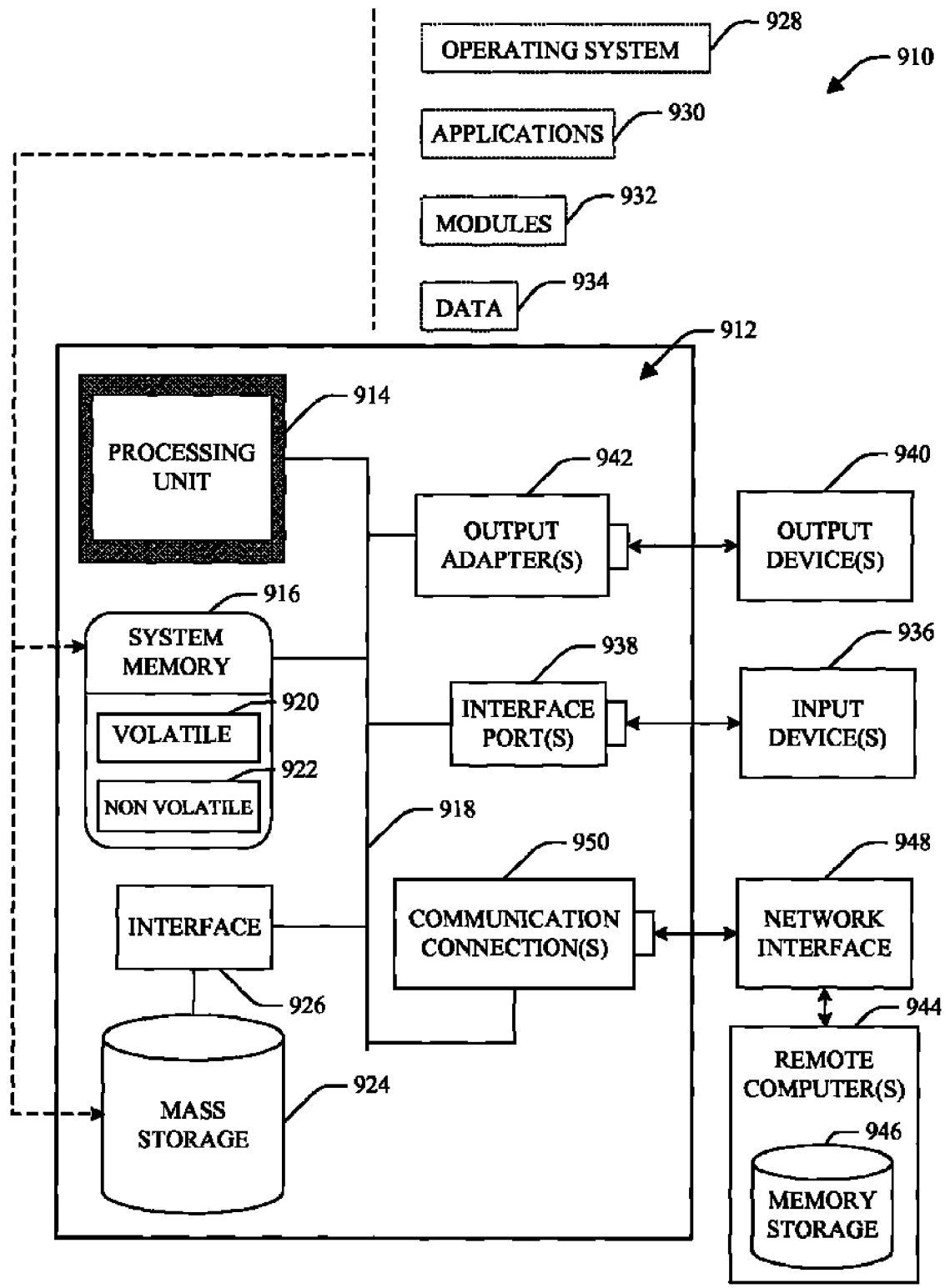
FIG. 9 illustrates an exemplary operating environment for implementing various aspects of the subject innovation.
Figure 10:
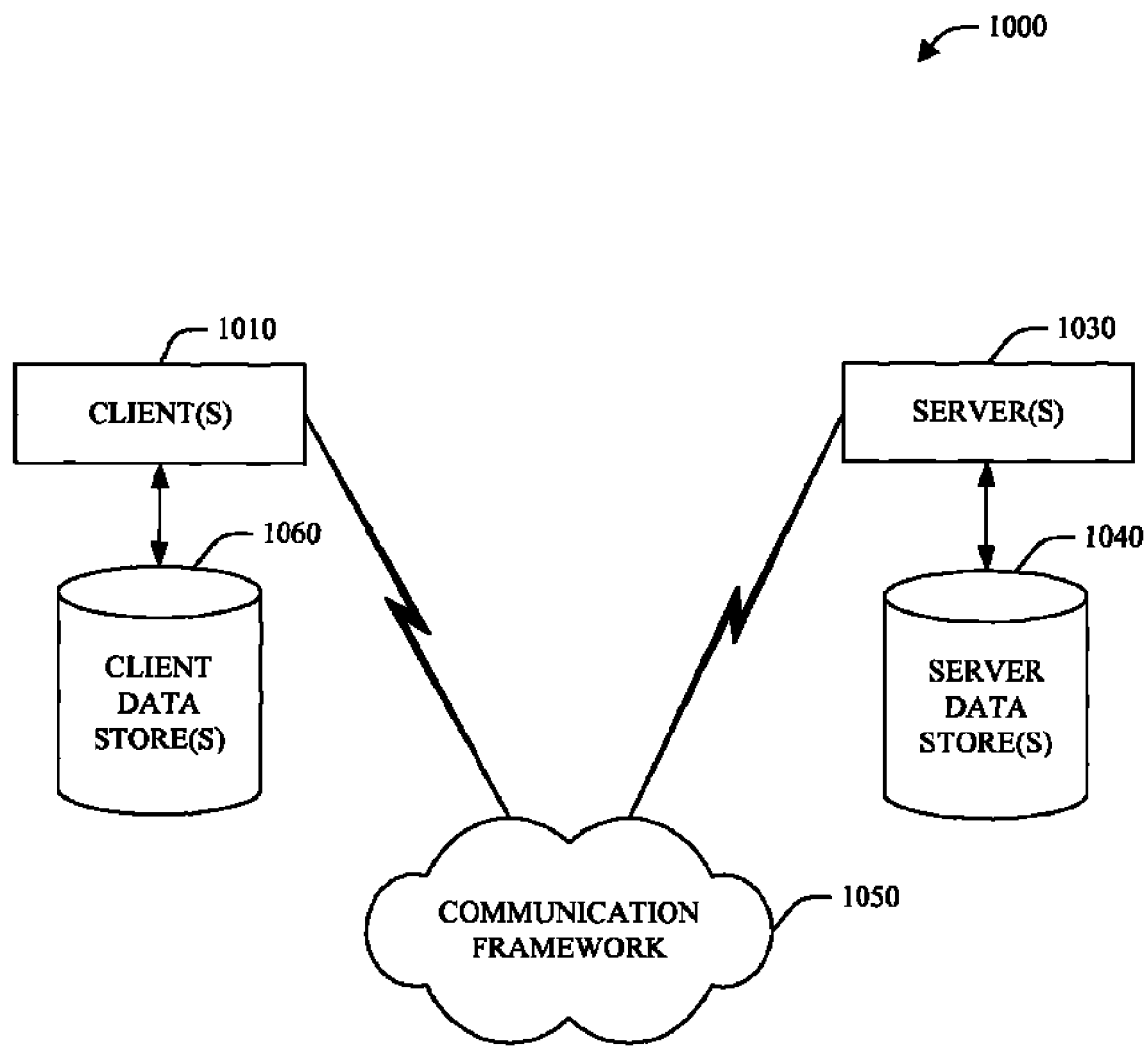
FIG. 10 is a schematic block diagram of a sample-computing environment with which the subject innovation can interact

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g. personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 9, an exemplary environment 910 for implementing various aspects of the subject innovation includes a computer 912 (e.g., desktop, laptop, server, hand held, programmable consumer or industrial electronics . . . ). The computer 912 includes a processing unit 914, a system memory 916, and a system bus 918. The system bus 918 couples system components including, but not limited to, the system memory 916 to the processing unit 914. The processing unit 914 can be any of various available microprocessors. Dual microprocessors and other multiprocessor architectures (e.g. multi-core) also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory.

Computer 912 also includes removable/non-removable, volatile/non-volatile computer storage media. FIG. 9 illustrates, for example, mass or auxiliary storage 924. Mass storage 924 includes, but is not limited to, devices like a magnetic disk drive, floppy disk drive, tape drive, Jaz drive, Zip drive, LS-100 drive, flash memory card, or memory stick. In addition, mass storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the mass storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on mass storage 924 and loaded to system memory 916, acts to control and allocate resources of the system 912. System applications 930 take advantage of the management of resources by operating system 928 through program modules 932 and program data 934 stored either in system memory 916 or on mass storage 924. It is to be appreciated that the subject innovation can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912 and to output information from computer 912 to an output device 940. Output adapter 942 is provided to illustrate that there are some output devices 940 like displays (e.g., flat panel, CRT, LCD, plasma . . . ), speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected (e.g., wired or wirelessly) via communication connection 950. Network interface 948 encompasses communication networks such as local-area networks (LAN) and wide-area networks (WAN).

Communication connection(s) 950 refers to the hardware/software employed to connect the network interface 948 to the bus 918. While communication connection 950 is shown for illustrative clarity inside computer 916, it can also be external to computer 912. The hardware/software necessary for connection to the network interface 948 includes, for exemplary purposes only, internal and external technologies such as, modems including regular telephone grade modems, cable modems, power modems and DSL modems, ISDN adapters, and Ethernet cards or components.

FIG. 10 is a schematic block diagram of a sample-computing environment 1000 with which the subject innovation can interact. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing the subject innovation, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030. For example, the virtual reality component can be associated with server(s) 1030. This web service server can also be communicatively coupled with a plurality of other servers 1030, as well as associated data stores 1040, such that it can function as a proxy for the client 1010.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A computer implemented system comprising the following computer executable components:
    a graphical processing unit that is divisible to a plurality of processing resources, each resource is associated with a node and is controllable independent of other resources, wherein the nodes comprise multiple engines that are assigned execution threads and allocated dynamic memory access (DMA) buffers;
    a scheduler, for each node, that schedules operations for the multiple engines, wherein the scheduler employs synchronization primitives shared among the plurality of processing resources to process ordering interactions therebetween; and
    a tracking component determines when operations on a specified DMA buffer require synchronization, wherein
        if synchronization is required and the specified DMA buffer is busy, the operations are blocked until the specified DMA buffer is available, and
        if synchronization is not required and the specified DMA buffer is busy, the operations are allowed on the specified DMA buffer.

2. The computer implemented system of claim 1 further comprising a plurality of execution threads exclusively associated with engines that form the plurality of processing resources.

3. The computer implemented system of claim 2 further comprising a Display Driver Interface (DDI) in kernel mode.

4. The computer implemented system of claim 3 further comprising independent communication channels established between user mode driver and the engines.

5. The computer implemented system of claim 1 further comprising GPU threads of execution that represent the GPU as an address space.

6. The computer implemented system of claim 5 further comprising a GPU context with a command buffer, allocation list, patch location list and pools of buffers associated therewith.

7. The computer implemented system of claim 6 further comprising a plurality of independent physical adapters merged into a single logical adapter.

8. The computer implemented system of claim 7 further comprising a kernel mode driver that maintains a ring buffer per engine.

9. The computer implemented system of claim 8 further comprising a driver that exposes engine topology to the scheduler followed by instantiation of a hardware queue per engine.

10. A computer implemented method comprising the following computer executable acts:
    dividing a graphic processing unit (GPU) into a plurality of isolated resources, wherein each resource is associated with a node having multiple engines;
    creating threads of execution against each node;
    allocating dynamic memory access (DMA) buffers for the multiple engines;
    determining by a tracking component when operations on a specified DMA buffer require synchronization, wherein
        if synchronization is required and the specified DMA buffer is busy, the operations are blocked until the specified DMA buffer is available, and
        if synchronization is not required and the specified DMA buffer is busy, the operations are allowed on the specified DMA buffer;
    instructing a scheduler of ordering operations; and
    controlling the plurality of isolated resources independent of one another.

11. The computer implemented method of claim 10 further comprising synchronizing primitives to process interactions with different requirements of engines associated with the resources.

12. The computer implemented method of claim 10 further comprising employing multiple threads to instruct a scheduler of ordering operation.

13. The computer implemented method of claim 10 further comprising exposing engine topology to the scheduler and instantiation of a hardware queue per engine.

14. The computer implemented method of claim 10 further comprising employing user mode display driver interface (DDI) to create context against a node associated with the GPU.

15. The computer implemented method of claim 10 further comprising merging multiple independent physical adapters into a single logical adapter.

16. The computer implemented method of claim 10 further comprising distributing processing task across physical adapters to provide work in combination.

17. A computer implemented system comprising the following computer executable components:
    a scheduler, for each node associated with a graphical processing unit resource, configured to schedule operations for multiple engines associated with the graphical processing unit, wherein the scheduler employs synchronization primitives shared among the plurality of processing resources to process ordering interactions; and a tracking component of the computer system configured to maintain the status of allocations employed by the multiple engines, wherein the tracking component ensures proper synchronization for locking, destroying, and paging, and determines when operations on a specified DMA buffer require synchronization, wherein if synchronization is required and the specified DMA buffer is busy, the operations are blocked until the specified DMA buffer is available, and if synchronization is not required and the specified DMA buffer is busy, the operations are allowed on the specified DMA buffer.

18. The computer implemented system of claim 17, further comprising at least one hardware queue for each engine.

19. The computer implemented system of claim 17, further comprising a display driver interface that creates contexts for each node corresponding to physical adapters of the computer implemented system.

* * * * *